UNITED STATES PATENT OFFICE.

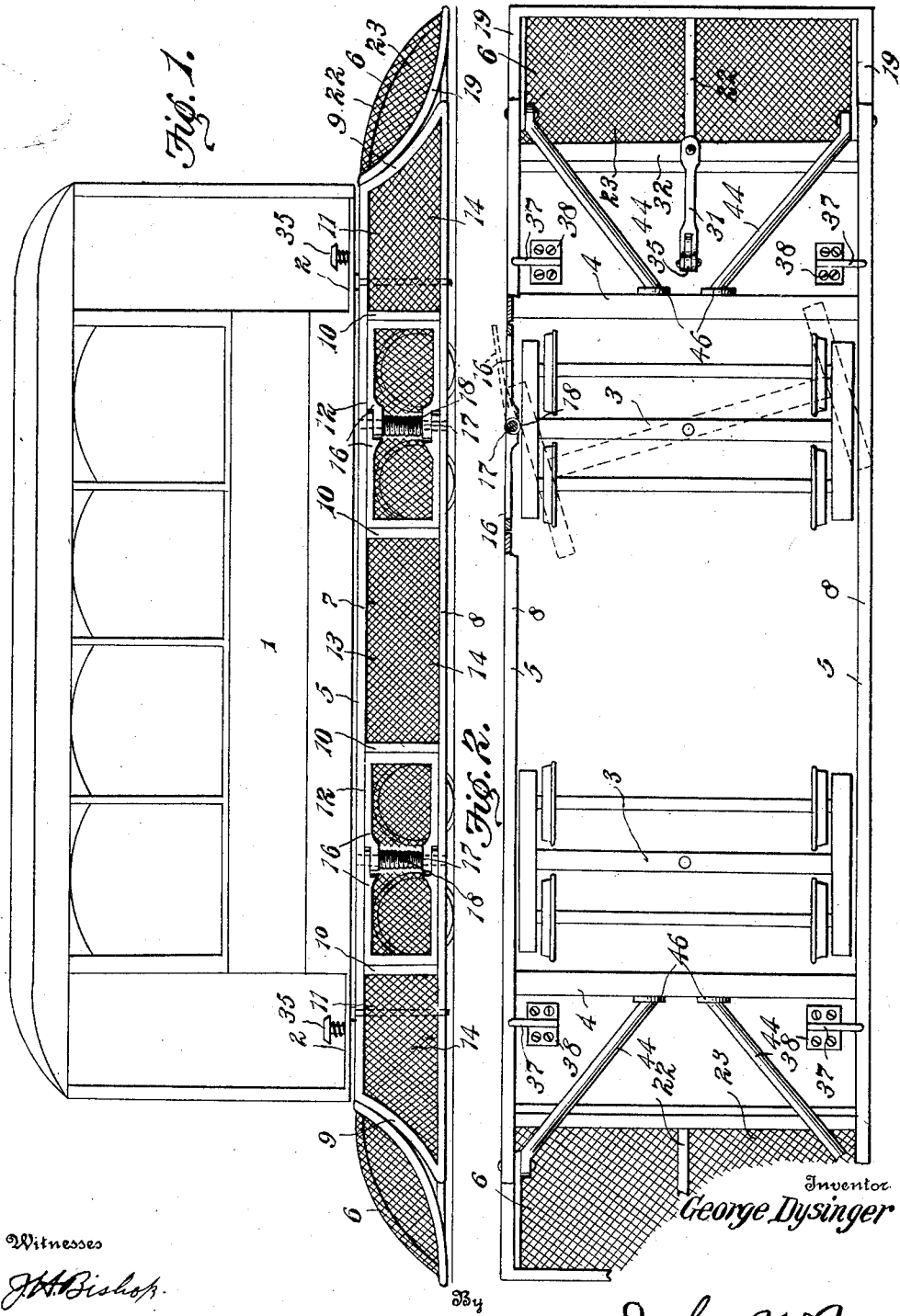

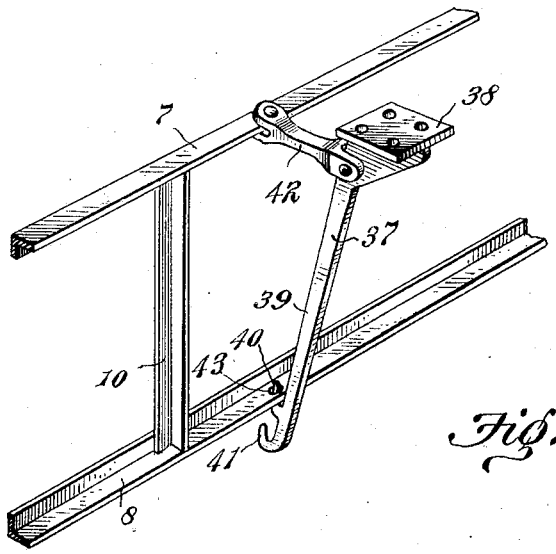

GEORGE DYSINGER, OF TOLEDO, OHIO.

CAR-FENDER.

965,167. Specification of Letters Patent. Patented July 26, 1910.

Application filed November 26, 1909. Serial No. 530,073.

*To all whom it may concern:*

Be it known that I, GEORGE DYSINGER, a citizen of the United States, residing at Toledo, county of Lucas, and State of Ohio, have invented certain new and useful Improvements in Car-Fenders, of which the following is a specification.

My invention relates to car fenders particularly adapted for use on motor cars and particularly to a combined front and rear fender and wheel guards.

The object of my invention is to provide a device of the class mentioned which shall be of improved construction whereby it may be readily arranged upon the ordinary street railway car.

A further object of my invention is to provide an improved front and rear fender which shall normally remain raised above the rails and which may be readily and quickly operated by the motorman to throw the same into or approximately into contact with the rails when necessary.

A further object of my invention is to provide a combined fender and wheel guard as mentioned equipped with means for holding the same at different desired distances above the rail and of such construction as to be readily and quickly adjusted when desired.

A further object of my invention is to provide a wheel guard adapted to extend substantially the full length of the car and provided with gates adjacent the car trucks to permit portions of the trucks to extend beyond the guard when the car is passing around curves, without injuring the guards.

Other objects will appear hereinafter.

With these objects in view my invention consists generally in a pair of wheel guards adapted to be arranged one upon each side of a car and extending substantially the full length thereof, and a fender pivotally mounted upon each end of said guards, together with means whereby the motorman may readily depress the fender when necessary.

My invention further consists in a device as mentioned provided with hangers adapted to be secured beneath the car and by means of which the device may be supported at various heights.

My invention further consists in a device characterized as above mentioned and equipped with spring gates hingedly mounted adjacent the car trucks to permit portions of the truck to project beyond the guards when the car is passing around curves in the track thereby permitting the guards to be arranged under the sides of the car and close to the trucks.

My invention further consists in various details of construction and arrangement of parts all as will be fully described hereinafter and particularly pointed out in the claims.

My invention will be more fully understood by reference to the accompanying drawings forming a part of this specification and in which:

Figure 1 is a side elevation of a car equipped with a wheel guard and fender embodying my invention in its preferred form, Fig. 2 is a bottom plan view thereof, Fig. 3 is a perspective view of one of the hangers and the adjacent portion of one of the side or wheel guard frames, and Fig. 4 is a vertical longitudinal section through the forward portion of the device and the adjacent portions of the car, illustrating the manner of supporting and operating one of the fenders.

Referring now to the drawings 1 indicates a car of which 2—2 are the platforms, 3—3 the trucks and 4—4 transverse members of the under frame. The car and the portions thereof which are shown, are illustrated conventionally, no attempt being made to show the same in detail.

The device embodying my invention comprises a pair of side members or wheel guards 5—5 which extend the full length of the car, a pair of end fenders 6—6 pivotally mounted between the ends of the guards 5—5 and means for operating the fender from the platforms of the car. The side members of wheel guards 5—5 each consist of a frame, preferably formed of angle irons and comprising the horizontal top and bottom frame members 7 and 8 respectively and the end of frame members 9—9. The frame also includes the vertical brace members 10 which divide the frames into a plurality of panels 11, 12 and 13. Each panel 11 and 13 is provided with a screen 14 which preferably consists of a frame 15 removably secured in the respective panels and upon which is stretched or secured a heavy net or wire mesh. By providing the separate detachable frames 15 the screens may be readily removed for repair when necessary and also allow access to the under portions of the car without the necessity of removing the entire device.

The panels 12 are arranged adjacent the ends of the car trucks 3 and are each provided with a pair of gates 16 hingedly mounted upon a common central vertical axis as at 17, the axis 17 preferably comprising a rod having its ends secured in the frame members 7 and 8. The gates 16 are engaged by the adjacent portions of the trucks when the car is making a curve and are pushed open a short distance by the trucks at such times, thereby permitting the guards 5 to be arranged close in under the sides of the car and also permitting turning of the trucks without injury to the guards. 18 indicates springs for normally holding the gates 16 in closed position.

The end fenders each comprise a frame formed of a pair of downwardly and forwardly curved members 19 and the horizontal members 20 and 21 connecting their upper and lower ends respectively. Connecting the members 20 and 21 at substantially their central points is an outwardly bowed member 22 and covering the frame thus made is a wire netting 23. It is obvious that from the shape of the frame the contour of the netting 23 will be such as to throw any object struck by the fender to the side of the track and the side guards 5 will prevent the object or person from rolling back under the wheels or throwing an arm or leg thereunder as is frequently the case. The members 9 of the side guard frames are shaped to conform substantially to the members 19 of the fender and the members 19 normally rest thereon. The members 19 are each provided with an arm 24 which extends rearwardly, preferably from the lower portion of the fender, to points within the guards 5 to which their inner ends are pivoted as at 25, a bracket 26 being preferably secured to the member 8 of the side frame for this purpose.

Secured beneath the platform 2 of the car is a bracket 27 upon which is pivotally mounted a bell-crank lever 28 having the arms 29 and 30. Pivotally connected to the arm 30 and extending forwardly therefrom is a connecting rod 31, the forward end of which is pivotally connected to a bar 32 extending between the members 19 of the fender near the upper end thereof. Extending upwardly from the arm 29 is a rod 33 which projects through an aperture 34 in the platform terminating at its upper end in a head 35. Interposed between said head and the platform is a spring 36 which normally tends to raise the rod 33, thereby retracting the rod 31 and maintaining the fender in raised position. When the motorman sees a person on the track and in danger of being struck by the car he depresses the rod 33 with his foot, thereby moving the rod 31 forwardly and lowering the forward end of the fender into contact or approximately into contact with the rail.

The device is supported on the car by brackets 37 secured beneath the car. Each bracket comprises a base plate 38 which is perforated to receive the bolts by which it is secured in position and an outwardly and downwardly extending arm 39 terminating or provided at its lower end with two or more hooks 40 and 41 arranged one above the other. Pivotally connected to the bracket 37 is an outwardly extending arm 42 which is connected at its outer end to the member 7 of the wheel guard frame. The hooks 40 and 41 are adapted to engage eyes 43 in the frame member 8 to support the device. It is obvious that the height of the device from the rails may be readily adjusted by engaging the eyes 43 with the desired hooks on the arms 39.

To suitably brace the device and to relieve the brackets 37 of undue strain I provide the brace rods 44. These extend from the transverse members 4 of the car frame forwardly and downwardly to the forward ends of the side guard frame and are preferably secured thereto at the same point where the fender is pivoted. The rods 44 also preferably extend diagonally outwardly to brace the device against lateral strain. The upper ends of the rods 44 are loosely mounted in apertures 45 in the members 4 in order to permit raising and lowering of the device on the hooks 40—41, and are provided with thrust collars 46 which bear against the members 4.

Having thus described my invention what I claim as new and desire to secure by Letters Patent is:

1. In a device of the class described, a car in combination with a safety device comprising a pair of side guards extending substantially the length of the car, end fenders mounted upon the ends of said guards, brackets secured to said car, a plurality of superimposed hooks on said brackets adapted to engage the lower portion of said guard to support the device at different heights and a pivoted link connecting each of said brackets to the upper portion of said guards, substantially as described.

2. In a device of the class described, a car, in combination with a safety device comprising side guards arranged beneath the edges of the car and extending substantially the entire length of the car, and gates hingedly mounted on said guards adjacent the trucks of the car and springs for normally maintaining said gates in closed position, substantially as described.

3. In a device of the class described, a car, in combination with a safety device comprising side guards arranged beneath the edges of the car close to the trucks and extending substantially the length of the car, said guards being provided with openings adjacent the trucks to permit free turning of the same without injuring said guards, and a pair of spring gates normally closing said openings and hingedly mounted on a central vertical axis arranged between said gates, substantially as described.

4. In a device of the class described, a car, in combination with a safety device comprising a pair of side guards arranged beneath the edges of the car and extending substantially the entire length of the car, and fenders pivotally mounted on said guards, means on said car for supporting said device at various heights and braces extending downwardly and outwardly from the under frame of the car to the forward ends of said side guards, substantially as described.

In testimony whereof I have signed my name to this specification in the presence of two subscribing witnesses.

GEORGE DYSINGER.

Witnesses:
C. L. CANFIELD,
WM. C. BOSCHARD.